US006718484B1

(12) United States Patent
Kodera

(10) Patent No.: US 6,718,484 B1
(45) Date of Patent: Apr. 6, 2004

(54) DEBUGGING METHOD AND APPARATUS FOR MULTITASK PROGRAMS AND RECORDING MEDIUM STORING A PROGRAM REALIZING THE DEBUGGING METHOD AND APPARATUS

(75) Inventor: Yoshihito Kodera, Numazu (JP)

(73) Assignee: Fujitsu Limited, Kawasaki (JP)

( * ) Notice: Subject to any disclaimer, the term of this patent is extended or adjusted under 35 U.S.C. 154(b) by 432 days.

(21) Appl. No.: 09/620,077

(22) Filed: Jul. 20, 2000

(30) Foreign Application Priority Data

Nov. 8, 1999 (JP) .......................................... 11-316220

(51) Int. Cl.[7] .............................................. G06F 11/28
(52) U.S. Cl. ............................. 714/35; 714/12; 714/34; 717/129
(58) Field of Search ............................. 714/34, 35, 12; 717/129, 130

(56) References Cited

U.S. PATENT DOCUMENTS

| 5,365,228 | A | * | 11/1994 | Childs et al. ............... 340/2.21 |
| 5,721,921 | A | * | 2/1998 | Kessler et al. ............... 709/102 |
| 5,768,538 | A | * | 6/1998 | Badovinatz et al. ......... 709/248 |
| 5,867,723 | A | * | 2/1999 | Chin et al. ..................... 712/11 |

FOREIGN PATENT DOCUMENTS

| JP | 634339 | 1/1988 |
| JP | 2300942 | 12/1990 |
| JP | 4314141 | 11/1992 |

OTHER PUBLICATIONS

Ramakrishnan et al.; Efficient Techniques for Fast Nested Barrier Synchronization; 1995; SPAA '95; pp. 157–164.*
Anderson, James R.; Simulation and Analysis of Barrier Synchronization Methods; May 29, 1995; University of Minnesota High–Performance Parallel Computing Research Group; pp. 1–4.*

* cited by examiner

Primary Examiner—Scott Baderman
Assistant Examiner—Joshua Lohn
(74) Attorney, Agent, or Firm—Greer, Burns & Crain, Ltd.

(57) ABSTRACT

A debugging method and apparatus for multitask programs, and a recording medium storing a program used for realization of the debugging method and apparatus enable each of arbitrarily-selected tasks to be stopped at an arbitrary target program position. A plurality of barrier synchronization points are set. Each of the barrier synchronization points groups a break point set for each of a plurality of tasks. A barrier synchronization point which includes a break point that has first stopped a corresponding task is specified. Tasks having breakpoints belonging to the specified barrier synchronization point are sequentially stopped at the respective breakpoints. When all the tasks have stopped, the suspended tasks are brought back to an executable state.

20 Claims, 14 Drawing Sheets

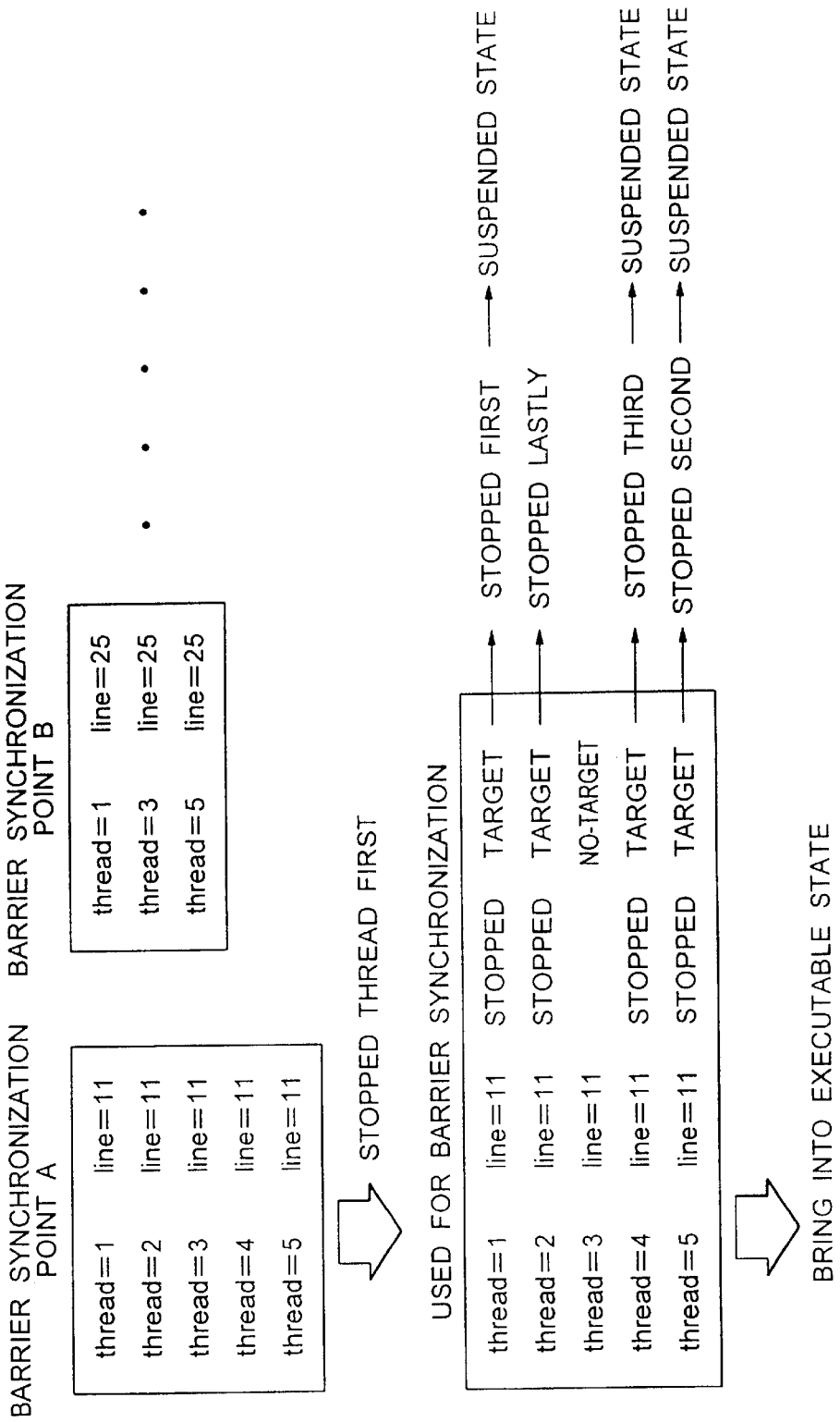

FIG. 12

```
1  #include  <stdio,h>
2  #include  <thread,h>
3
4  int        array[50];
5
6  void       sub(int begin)
7  {
8             int        i;
9
10            for( i=0 ; i<10 ; i++ ) array[ begin + i ] = begin;
11            printf(" INITIALIZED array[%d-%d] ¥n",begin.begin+9);
12            for( i=0 ; i<10 ; i++ ) array[ begin + i ] += i;
13 }
14 void       ±PE(void *arg)
15 {
16            sub( *(int *)arg );
17
18            thr-exit( 0 );
19 }
20 main()
21 {
22            int        i,j, begin[5];
23            thread-t   id[4];
24
25            for( i=0 ; i<50 ; i** ) array[ i ]=99;
26
27            for( i=0,j=0 : i<4 ; i++, j+=10) {
28                       begin[ i ]=j;
29                       (void) thr-create(0, 0, PE, &begin[i], 0, &id[i]);
30            }
31
32            sub( j );
33
34            for( i=0 ; i<4 ; i++ ) (void) thr-join(id[i] , 0, 0, );
35
36            for( i=0 ; i<50 ; i++ ) printf("%d" , array[i]);
37            printf(" ¥n");
38 }
```

DEBUGGING METHOD AND APPARATUS FOR MULTITASK PROGRAMS AND RECORDING MEDIUM STORING A PROGRAM REALIZING THE DEBUGGING METHOD AND APPARATUS

CROSS REFERENCE TO RELATED APPLICATIONS

The contents of Japanese Patent Application No. 11-31622 filed on Nov., 1999 in Japan, are incorporated herein by reference.

BACKGROUND OF THE INVENTION

1. Field of the Invention

The present invention relates to a debugging method and apparatus for multitask programs, as well as to a recording medium storing a program used for realization of the debugging method and apparatus. More particularly, the present invention relates to a debugging method and apparatus which enables each of selected tasks to be stopped at an arbitrary target program position, as well as to a recording medium storing a program used for realization of such a debugging method and apparatus.

With the recent decrease in price of CPUs due to development of computer-related techniques, an increasing number of computer systems have employed a plurality of CPUs. Further, in order to effectively use a plurality of CPUs, in an increasing number of cases such a computer system has used a multitask program in which a plurality of tasks are performed concurrently and in parallel in order to execute a single job.

Multitask programs are divided into a multithread program which executes in parallel a plurality of interdependent threads in a process, and a multiprocess program which executes in parallel a plurality of interdependent processes. An examples of the multiprocess program include a network parallel program in which a plurality of processes are executed on a plurality of computer systems in a distributed manner.

In order to properly operate such a multitask program formed of a plurality of interdependent tasks, the plurality of selected tasks must be synchronized at a proper timing (program position). If this synchronization is not established, the multitask program does not operate properly.

In view of the foregoing, there has been demand for a debugging technique for multitask programs which effectively determines whether a plurality of selected tasks are synchronized at a proper timing.

2. Description of the Related Art

Japanese Patent Application Laid-Open (kokai) No. 2-300942 discloses an existing debugging technique for multitask programs in which a plurality of tasks are concurrently executed in parallel. In the technique, when execution of any one of a plurality of tasks designated among tasks which operate on an operating system is stopped (at a breakpoint set by a debugger), the remainder of the designated tasks are stopped at the same time.

Japanese Patent Application Laid-Open (kokai) No. 4-314141 discloses a multitask control technique. According to the multitask control technique, for the purpose of debugging, when an arbitrary task constituting a multitask job reaches a previously set stop point or when an exception occurs, all tasks belonging to the same multitask job group as the arbitrary task are stopped. Further, execution of all the tasks of the multitask job group is resumed at an arbitrary point in time.

Although not relating directly to debugging processing, Japanese Patent Application Laid-Open (kokai) No. 63-4339 discloses a technique for controlling a plant by use of a plurality of tasks which constitute plant control. In order to overcome a drawback such that a system of a plant which is not required to stop is stopped undesirably, tasks are managed in order to form a task group which includes tasks which must be stopped concurrently upon stoppage of any one of the tasks. In the task managing technique, when, in response to detection of an anomalous state, an operating system stops a task belonging to a certain group, the remaining tasks of the same group are stopped.

However, use of such an existing debugging technique makes it impossible to realize barrier synchronization which enables each of selected tasks to stop at an arbitrary target program position.

That is, the existing techniques disclosed in the above-described Japanese Patent Application Laid-Open Nos. 2-300942 and 4-314141 employ a configuration such that when execution of any one of grouped tasks is stopped, the remaining tasks of the group are stopped concurrently. Therefore, barrier synchronization which enables each of selected tasks to be stopped at an arbitrary target program position cannot be realized.

Such barrier synchronization becomes necessary for debugging of a multitask program in which a plurality of tasks perform initialization processing or calculation processing, each task taking partial charge of the processing.

One conceivable method for realizing such barrier synchronization is such that a barrier synchronization mechanism is built in a multitask program to undergo debugging, through rewriting thereof; a breakpoint is set (an instruction for stopping the program is embedded) at a program position at which barrier synchronization is guaranteed to be completed; and the multitask program is executed up to that position.

However, when this method is employed, a multitask program to undergo debugging must be rewritten for insertion of a barrier synchronization mechanism. In some cases this may hide the real cause of an anomaly. Further, when a barrier synchronization mechanism to be inserted has a defect, there arise various problems, such as necessity of work for searching the defect, or generation of a new bug.

SUMMARY OF THE INVENTION

In view of the above-described problems, a first object of the present invention is to provide a new debugging method and apparatus for a multitask program which enables each of selected tasks to be stopped at an arbitrary target program position.

A second object of the present invention is to provide a program recording medium which stores therein a program used for realization of the debugging method and apparatus.

A third object of the present invention is to provide a debugging method and apparatus which can perform debugging efficiently, as well as a program recording medium which stores therein a program used for realization of such a debugging method and apparatus.

A fourth object of the present invention is to provide a debugging apparatus which can perform debugging on the basis of barrier synchronization, while matching the sequence of execution of programs.

In order to achieve the above objects, the present invention provides a debugging apparatus for debugging a multitask program. It comprises setting means for setting a barrier synchronization point which groups a breakpoint set for each of a plurality of tasks; judgment means operating each time a different one of the tasks stops at a corresponding breakpoint, in order to judge whether all tasks having breakpoints belonging to the barrier synchronization point have stopped at the respective breakpoints; resumption means operating, upon judgment by the judgment means that not all the tasks have stopped, in order to bring a newly stopped task into a suspended state and then resume execution of a multithread program; and control means for bringing the suspended tasks back to an executable state when the judgment means judges that all the tasks have stopped.

Preferably, the debugging apparatus of the present invention further comprises specifying means for specifying a barrier synchronization point which includes a breakpoint having first stopped a task. When a task stops at a breakpoint belonging to the specified barrier synchronization point, the judgment means judges whether all tasks having breakpoints belonging to the barrier synchronization point specified by the specifying means have stopped at the respective breakpoints.

In order to achieve the above objects, the present invention provides a debugging method for debugging a multitask program. It comprises setting a barrier synchronization point which groups a breakpoint set for each of a plurality of tasks; each time a different one of the tasks stops at a corresponding breakpoint, judging whether all tasks having breakpoints belonging to the barrier synchronization point have stopped at the respective breakpoints; upon judgment that not all the tasks have stopped, bringing a newly stopped task into a suspended state and then resuming execution of a multithread program; and bringing the suspended tasks back to an executable state when all the tasks are judged to have stopped.

Preferably, the debugging method of the present invention further comprises specifying a barrier synchronization point which includes a breakpoint having first stopped a task. When a task stops at a breakpoint belonging to the specified barrier synchronization point, judgment is performed as to whether all tasks having breakpoints belonging to the specified barrier synchronization point have stopped at the respective breakpoints.

In order to achieve the above objects, the present invention provides a program recording medium storing a program for realizing a debugging apparatus for multitask programs, the program causing a computer to perform: setting processing for setting a barrier synchronization point which groups a breakpoint set for each of a plurality of tasks; judgment processing, each time a different one of the tasks stops at a corresponding breakpoint, in order to judge whether all tasks having breakpoints belonging to the barrier synchronization point have stopped at the respective breakpoints; resumption processing, upon judgment by the judgment processing that not all the tasks have stopped, in order to bring a newly stopped task into a suspended state and then resume execution of a multithread program; and control processing for bringing the suspended tasks back to an executable state when the judgment processing judges that all the tasks have stopped.

Preferably, the program stored in the program recording medium further comprises specifying processing for specifying a barrier synchronization point which includes a breakpoint having first stopped a task. When a task stops at a breakpoint belonging to the specified barrier synchronization point, the judgment processing judges whether all tasks having breakpoints belonging to the barrier synchronization point specified by the specifying processing have stopped at the respective breakpoints.

The present invention further provides a debugging apparatus for debugging a multitask program, comprising: a setting unit for setting a barrier synchronization point which groups a breakpoint set for each of a plurality of tasks; a judgment unit operating each time a different one of the tasks stops at a corresponding breakpoint, in order to judge whether all tasks having breakpoints belonging to the barrier synchronization point have stopped at the respective breakpoints; a resumption unit operating, upon judgment by the judgment unit that not all the tasks have stopped, in order to bring a newly stopped task into a suspended state and then resume execution of a multithread program; and a control unit for bringing the suspended tasks back to an executable state when the judgment unit judges that all the tasks have stopped.

Preferably, the debugging apparatus of the present invention further comprises a specifying unit for specifying a barrier synchronization point which includes a breakpoint having first stopped a task. When a task stops at a breakpoint belonging to the specified barrier synchronization point, the judgment unit judges whether all tasks having breakpoints belonging to the barrier synchronization point specified by the specifying unit have stopped at the respective breakpoints.

Alternatively, the debugging apparatus of the present invention may be formed of the following units. That is, the debugging apparatus for multitask programs comprises a setting unit for setting a barrier synchronization point which groups a specific operation point, such as a breakpoint, set for each of a plurality of tasks; and an analysis position processing unit operating, when a task performs a specific operation at a corresponding operation point in order to bring into a suspended state all tasks having operation points belonging to the barrier synchronization point, and then bringing the suspended tasks back to an executable state.

These, together with other objects and advantages which will be subsequently apparent, reside in the details of construction and operation as more fully described and claimed hereinafter, with reference to the accompanying drawings, wherein like numerals refer to like parts throughout.

BRIEF DESCRIPTION OF THE DRAWINGS

FIG. 11 is a diagram used for description of an exemplary processing.

FIG. 12 shows an example of a multithread program.

DESCRIPTION OF THE PREFERRED EMBODIMENT

Figure 1:
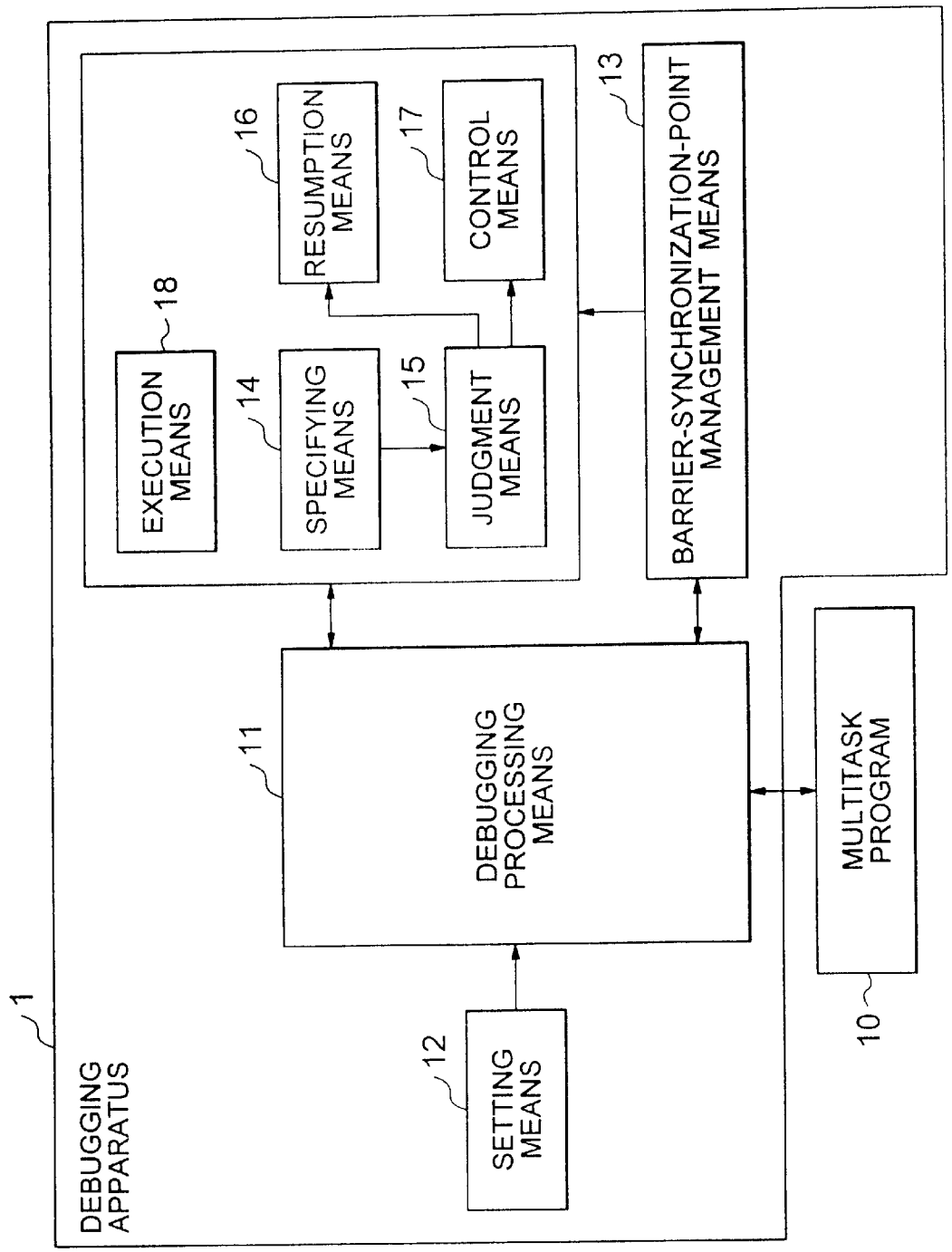
FIG. 1 is a block diagram showing the principle of the present invention.

FIG. 1 shows a basic embodiment or principle of the present invention.

In FIG. 1, reference numeral 1 denotes a debugging apparatus according to the present invention. Reference numeral 10 denotes a multitask program to be subjected to debugging. The debugging apparatus 1 comprises debugging processing means 11, setting means 12, barrier synchronization-point management means 13, specifying means 14, judgment means 15, resumption means 16, and control means 17. Further, execution means 18 may be provided.

The debugging processing means 11 performs debugging for the multitask program 10.

The setting means 12 sets one or more barrier synchronization points, each barrier synchronization point grouping breakpoints set for a plurality of tasks.

The barrier synchronization-point management means 13 manages information regarding the barrier synchronization point(s) set by the setting means 12.

In the case in which a plurality of barrier synchronization points are set by the setting means 12, the specifying means 14 operates in order to specify a barrier synchronization point which includes a breakpoint which has first stopped a corresponding task.

In the case in which a single barrier synchronization point is set by the setting means 12, the judgment means 15 operates, when a task stops at a breakpoint belonging to the barrier synchronization point, in order to judge whether all relevant tasks have stopped at corresponding breakpoints belonging to the barrier synchronization point.

In the case in which a plurality of barrier synchronization points are set by the setting means 12, the judgment means 15 operates, when a task stops at a breakpoint belonging to a barrier synchronization point specified by the specifying means 14, in order to judge whether all relevant tasks have stopped at corresponding breakpoints belonging to the specified barrier synchronization point.

When the judgment means 15 judges that not all relevant tasks have stopped, the resumption means 16 brings a newly stopped task into a suspended state and resumes the multitask program 10.

When the judgment means 15 judges that all relevant tasks have stopped, the control means 17 judges that the barrier synchronization has been completed and brings the suspended tasks back to a state in which the tasks can be executed.

In the debugging apparatus 1 according to the present invention having the above-described configuration, the setting means 12 sets a barrier synchronization point grouping a breakpoint set for each of a plurality of tasks. In response thereto, the debugging processing means 11 embeds into the multitask program 10 program stop commands corresponding to the breakpoints. Further, the barrier synchronization-point management means 13 manages information regarding the thus-set barrier synchronization points.

Subsequently, when the multitask program 10 is started, a relevant task stops in accordance with the embedded program stop command when the task reaches a breakpoint, and reports the stoppage to the debugging processing means 11. Upon receipt of the report from the debugging processing means 11, the judgment means 15 judges whether all relevant tasks have stopped at corresponding breakpoints belonging to the barrier synchronization point set by the setting means 12.

When the judgment means 15 judges that not all relevant tasks have stopped, the resumption means 16 brings a newly stopped task into a suspended state and resumes the multitask program 10. Meanwhile, when the judgment means 15 judges that all relevant tasks have stopped, the control means 17 judges that the barrier synchronization has been completed and brings the suspended tasks back to a state in which the tasks can be executed.

At this time, the execution means 18 operates as follows if a breakpoint which does not belong to the barrier synchronization point is set. Specifically, when after barrier synchronization operation is started in response to stoppage of a task at a breakpoint belonging to a certain barrier synchronization point, a task is stopped at a certain breakpoint not belonging to the barrier synchronization point, the execution means 18 resumes the multitask program 10 while ignoring the certain breakpoint. In this case, the speed of processing for barrier synchronization increases.

In the debugging apparatus 1 according to the present invention having the above-described configuration, the setting means 12 sets a plurality of barrier synchronization points, each barrier synchronization point grouping a plurality of breakpoints set in tasks. In response thereto, the debugging processing means 11 embeds into the multitask program 10 program stop commands corresponding to the breakpoints. Further, the barrier synchronization-point management means 13 manages information regarding the thus-set barrier synchronization points.

Subsequently, when the multitask program 10 is started, a relevant task stops in accordance with the embedded program stop command when the task reaches a breakpoint, and reports the stoppage to the debugging processing means 11.

Upon receipt of the report from the debugging processing means 11, the specifying means 14 specifies a barrier synchronization point which includes a breakpoint which has first stopped a corresponding task. That is, among the plurality of set barrier synchronization points, a barrier synchronization point used for barrier synchronization is specified. Subsequently, upon receipt of the report from the debugging processing means 11, the judgment means 15 judges whether all relevant tasks have stopped at corresponding breakpoints belonging to the barrier synchronization point set designated by the specifying means 14.

When the judgment means 15 judges that not all relevant tasks have stopped, the resumption means 16 brings the stopped tasks into a suspended state and resumes the multitask program 10. Meanwhile, when the judgment means 15 judges that all relevant tasks have stopped, the control means 17 judges that the barrier synchronization has been completed and brings the suspended tasks back to a state in which the tasks can be executed.

When a task is stopped at a certain breakpoint belonging to a barrier synchronization point other than the barrier synchronization point specified by the specifying means 14, the execution means 18 resumes the multitask program 10 while ignoring the certain breakpoint. In this case, the speed of processing for barrier synchronization increases.

When a breakpoint which does not belong to the barrier synchronization point is set, the execution means 18 operates as follows. Specifically, when after barrier synchronization operation is started in response to stoppage of a task at a breakpoint belonging to a certain barrier synchronization point, a task is stopped at a certain breakpoint not belonging to the barrier synchronization point, the execution means 18 resumes the multitask program 10 while ignoring the certain breakpoint. In this case, the speed of processing for barrier synchronization increases.

In the above-described manner, during debugging of the multitask program 10, the present invention enables establishment of barrier synchronization in which each of selected tasks are stopped at an arbitrary target program position.

Accordingly, debugging of a multitask program in which a plurality of tasks perform initialization processing or calculation processing, each task taking partial charges of the processing, can be performed efficiently.

In the present invention, in the case where the apparatus is configured to enable input of a plurality of barrier synchronization points, the apparatus is configured such that barrier synchronization is achieved by a barrier synchronization point to which a breakpoint first reached by a task belongs. Therefore, the apparatus can perform debugging on the basis of barrier synchronization while matching the execution sequence of a program.

In FIG. 1, the debugging apparatus of the present invention is shown as being formed of the respective means. However, the respective means may be formed of units, like hardware units or software units such as computer programs, configured to achieve the objects of the present invention. That is, the setting means 12, the specifying means 14, the judgment means 15, the resumption means 16, the control means 17, and the barrier synchronization-point management means 13 may be constructed in the form of a setting unit, a specifying unit, a judgment unit, a resumption unit, a control unit, and a barrier synchronization-point management unit, respectively. Alternatively, the setting means 12, the specifying means 14, the judgment means 15, the resumption means 16, the control means 17, and the barrier synchronization-point management means 13 may be integrally constructed in the form of an analysis position processing unit.

Now, the present invention will be described in detail by way of an embodiment.

In the description which follows, it is assumed that a multitask program to be debugged is a multithread program which executes in parallel a plurality of interdependent threads in a process. The present invention will be described in detail for the case in which a multithread program is debugged by use of a multithread debugger having a function for setting a breakpoint which is effective for an arbitrarily selected thread and a function for resuming execution of a selected thread.

Threads in such a multithread program have their individual stack areas but share a command area and a data area.

Figure 2:
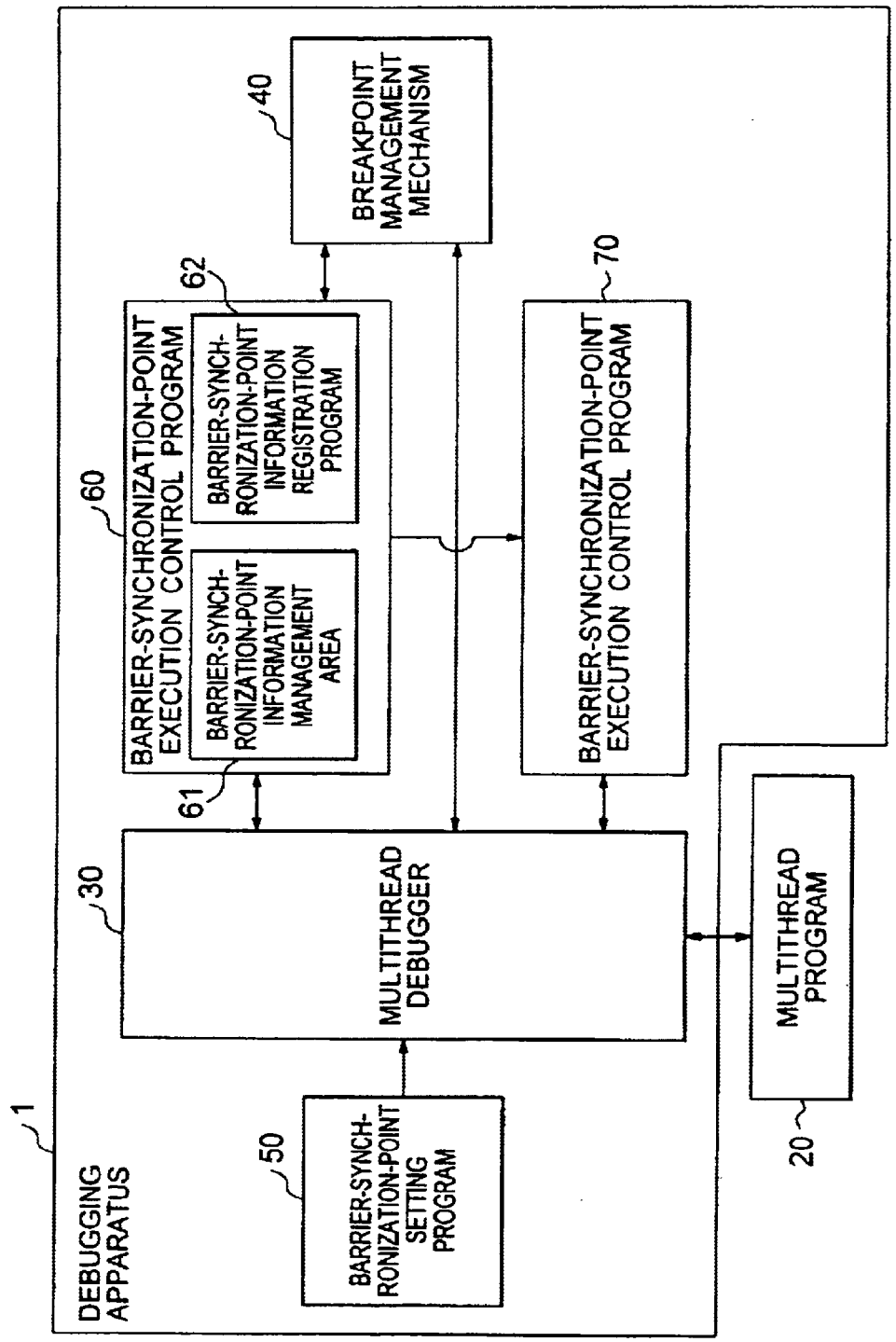
FIG. 2 is a block diagram showing an embodiment of the present invention.

FIG. 2 shows an embodiment of the debugger apparatus 1 of the present invention.

In FIG. 2, reference numeral 20 denotes a multithread program to be debugged; reference numeral 30 denotes a multithread debugger for debugging the multithread program 20; reference numeral 40 denotes a breakpoint management mechanism for managing breakpoints; reference numeral 50 denotes a barrier synchronization-point setting program provided for realizing the present invention; reference numeral 60 denotes a barrier synchronization-point management mechanism provided for realizing the present invention; and reference numeral 70 denotes a barrier synchronization-point execution control program for realizing the present invention. Each of the respective mechanisms may be configured in the form of a unit.

The multithread debugger 30 performs various types of processing in accordance with various instructions input from a programmer or the like and provides ordinary functions provided by existing multithread debuggers, such as a function for setting and canceling breakpoints for the multithread program 20 and a function for executing the program and resuming execution of the program.

The breakpoint management mechanism 40 performs various types of management in relation to breakpoints, such as setting and cancellation of breakpoints. In some cases, the breakpoint management mechanism 40 is built in the multithread debugger 30.

The barrier synchronization-point setting program 50 is installed from a floppy disk, a communication line, or any other source and is stored in a memory device in order to realize the present invention. For the multithread program 20, the barrier synchronization-point setting program 50 sets a barrier synchronization point through setting of breakpoints used for barrier synchronization, which define a thread to undergo barrier synchronization and a stop position for barrier synchronization.

For example, a barrier synchronization point is set such that threads 1, 2, 3, 4, and 5 are stopped by means of barrier synchronization at a program position corresponding to line 11 of the multithread program 20.

The barrier synchronization-point management mechanism 60 includes a barrier synchronization-point information management area 61 and a barrier synchronization-point information registration program 62. The barrier synchronization-point information management area 61 manages information regarding barrier synchronization points set by the barrier synchronization-point setting program 50. The barrier synchronization-point information registration program 62 registers the information regarding barrier synchronization points into the barrier synchronization-point information management area 61. The barrier synchronization-point information registration program 62 is installed from a floppy disk, a communication line, or any other source and is stored in a memory device.

The barrier synchronization-point execution control program 70 is installed from a floppy disk, a communication line, or any other source and is stored in a memory device in order to realize the present invention. The barrier synchronization-point execution control program 70 controls barrier synchronization in accordance with the present invention, while referring to the barrier synchronization-point information stored in the barrier synchronization-point information management area 61.

Figure 3:
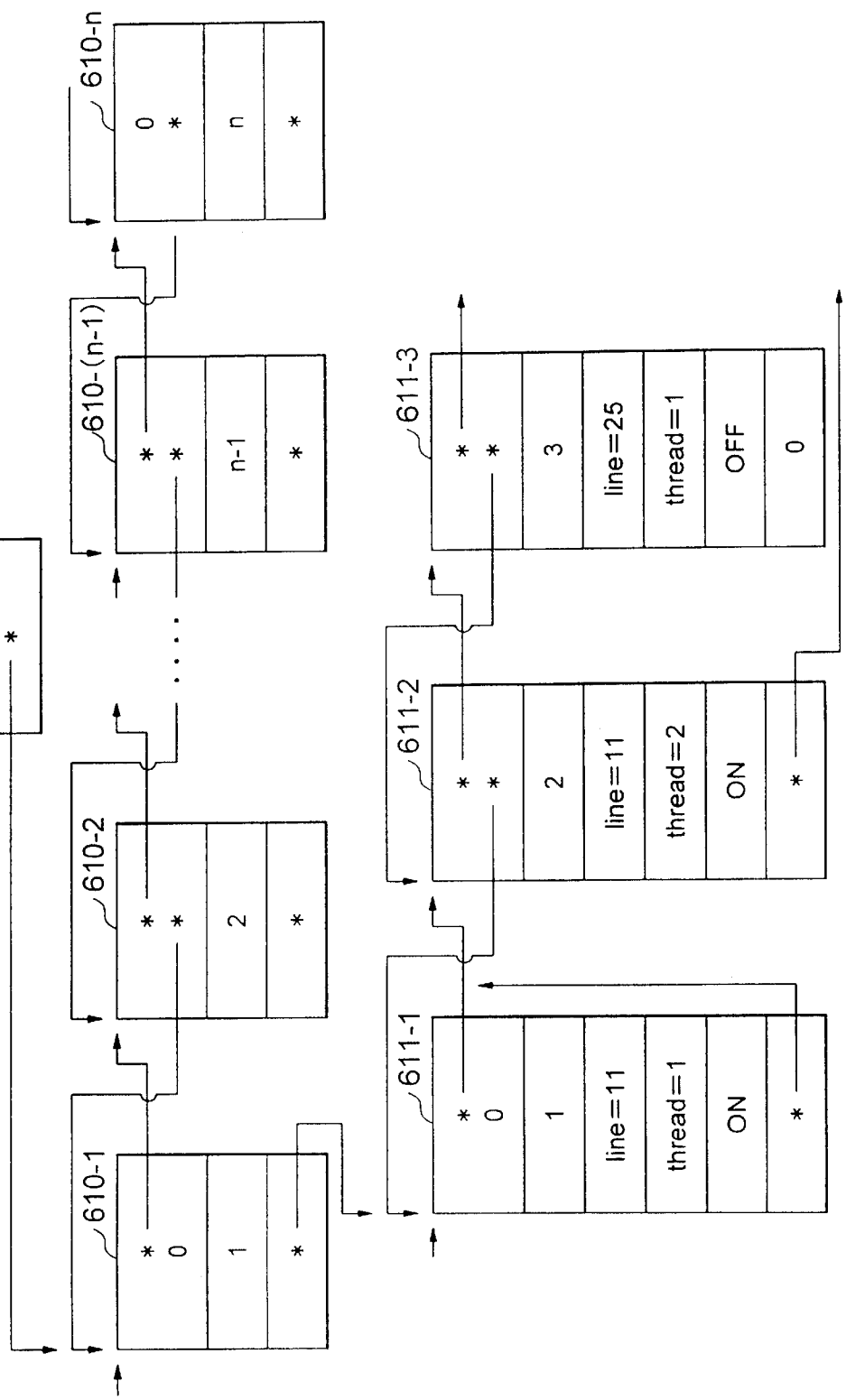
FIG. 3 shows an example of barrier synchronization-point management employed in the embodiment.

FIG. 3 shows an exemplary data structure of the barrier synchronization-point information stored in the barrier synchronization-point information management area 61.

As shown in FIG. 3, the barrier synchronization-point information management area 61 stores barrier synchronization information by use of a barrier synchronization-point management block 610-i (i=1 to n) for storing an ID of a barrier synchronization point, a breakpoint management block 611-i (i=1, 2, . . . ) for storing information regarding breakpoints, and an enabled-barrier synchronization-point management block 612 for storing information regarding a barrier synchronization point currently being used for barrier synchronization.

Figure 4:
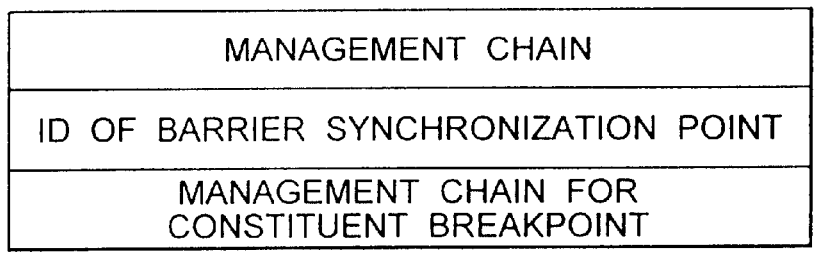
FIG. 4 shows an example of a barrier synchronization-point management block used in the embodiment.

As shown in FIG. 4, the barrier synchronization-point management block 610-i stores a management chain which indicates chaining to barrier synchronization-point management blocks which precede and succeed, respectively, the barrier synchronization-point management block 610-i; an ID of a barrier synchronization point managed by the barrier synchronization-point management block 610-i; and a management chain (management chain for constituent breakpoint) which indicates chaining to a lead-off breakpoint management block 611-i which stores a constituent breakpoint of the barrier synchronization-point.

Figure 5:
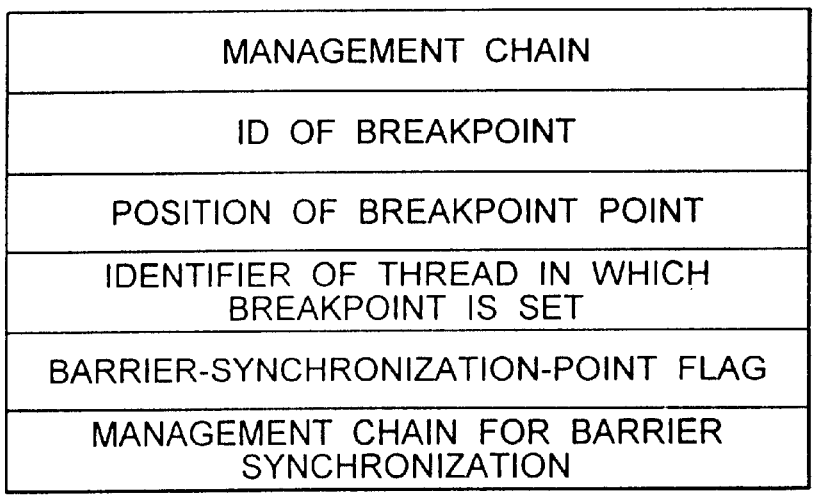
FIG. 5 shows an example of a breakpoint management block used in the embodiment.

As shown in FIG. 5, the breakpoint management block 611-i stores a management chain which indicates chaining to breakpoint management blocks which precede and succeed, respectively, the breakpoint management block 611-i; an ID of a breakpoint managed by the breakpoint management block 611-i; a program position of the breakpoint; an identifier of a thread in which the breakpoint is set; a flag (barrier synchronization-point flag) indicating whether the breakpoint constitutes a barrier synchronization point; and a management chain (management chain for barrier synchronization) which indicates chaining to another breakpoint management block 611-i which stores another constituent breakpoint of the same barrier synchronization point.

Figure 6:
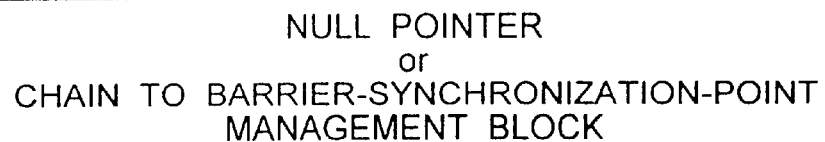
FIG. 6 shows an example of an enabled-barrier synchronization-point management block used in the embodiment.

As shown in FIG. 6, when a certain barrier synchronization point is currently being used for barrier synchronization, the enabled-barrier synchronization-point management block 612 stores information regarding chaining to a barrier synchronization-point management block 610-i which stores the barrier synchronization point. When no barrier synchronization point is currently being used for barrier synchronization, the enabled-barrier synchronization-point management block 612 stores a NULL pointer. During barrier synchronization, the address of a relevant barrier synchronization-point management block is set in the enabled-barrier synchronization-point management block 612.

FIG. 3 shows an exemplary case in which n barrier synchronization points having respective identifiers "1" to "n" are set by use of the barrier synchronization-point management block 610-i and the breakpoint management block 611-i having the above-described data structures, and in which a barrier synchronization point having an identifier "1" is formed of a breakpoint having an identifier "1" (program position=line 11, the identifier of a designated-thread=1), a breakpoint having an identifier "2" (program position=line 11, the identifier of a designated-thread=2), etc. In this case, information regarding the barrier synchronization point having an identifier "1" is stored through establishment of chaining as shown in FIG. 3.

Further, the barrier synchronization point having an identifier "1" is stored to be a barrier synchronization point currently being used for barrier synchronization, through use of the enabled-barrier synchronization-point management block 612 and establishment of chaining as shown in FIG. 3. In the above-described management scheme, breakpoint management blocks 611-i (i=1, 2, . . . ) are provided for all breakpoints (including breakpoints which do not constitute a barrier synchronization point); and among the breakpoint management blocks 611-i, breakpoint management blocks 611-i for breakpoints that constitute a barrier synchronization point are connected together in order to manage breakpoints of the barrier synchronization point. However, breakpoint management blocks 611-i (e.g. breakpoint management block 611-3 in FIG. 3) for breakpoints that constitute no barrier synchronization point may be omitted when the debugging apparatus is constructed for the sole purpose of realization of the present invention.

Figure 7:
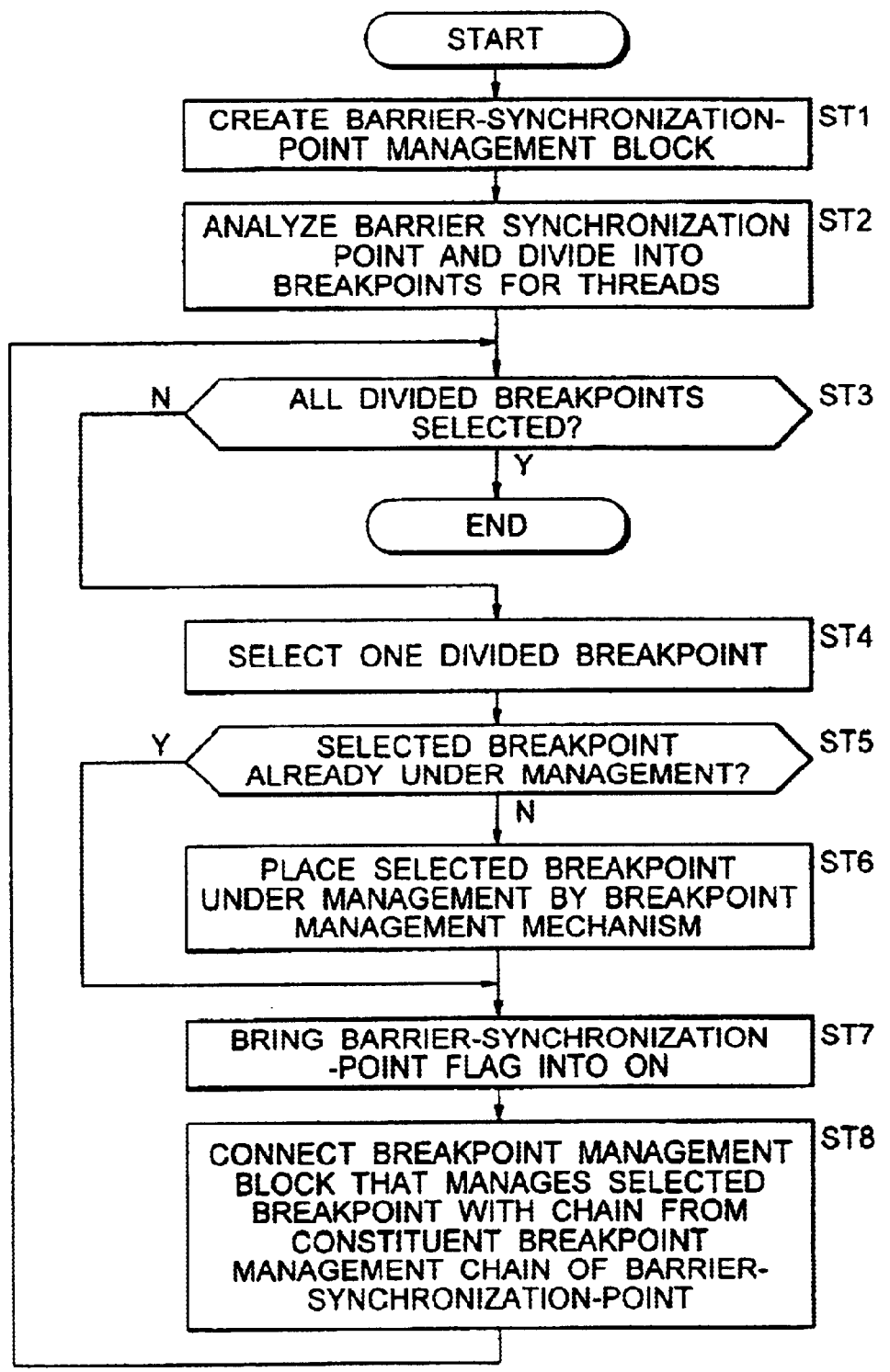
FIG. 7 is a flowchart showing a program for registering barrier synchronization-point information.
Figure 8:
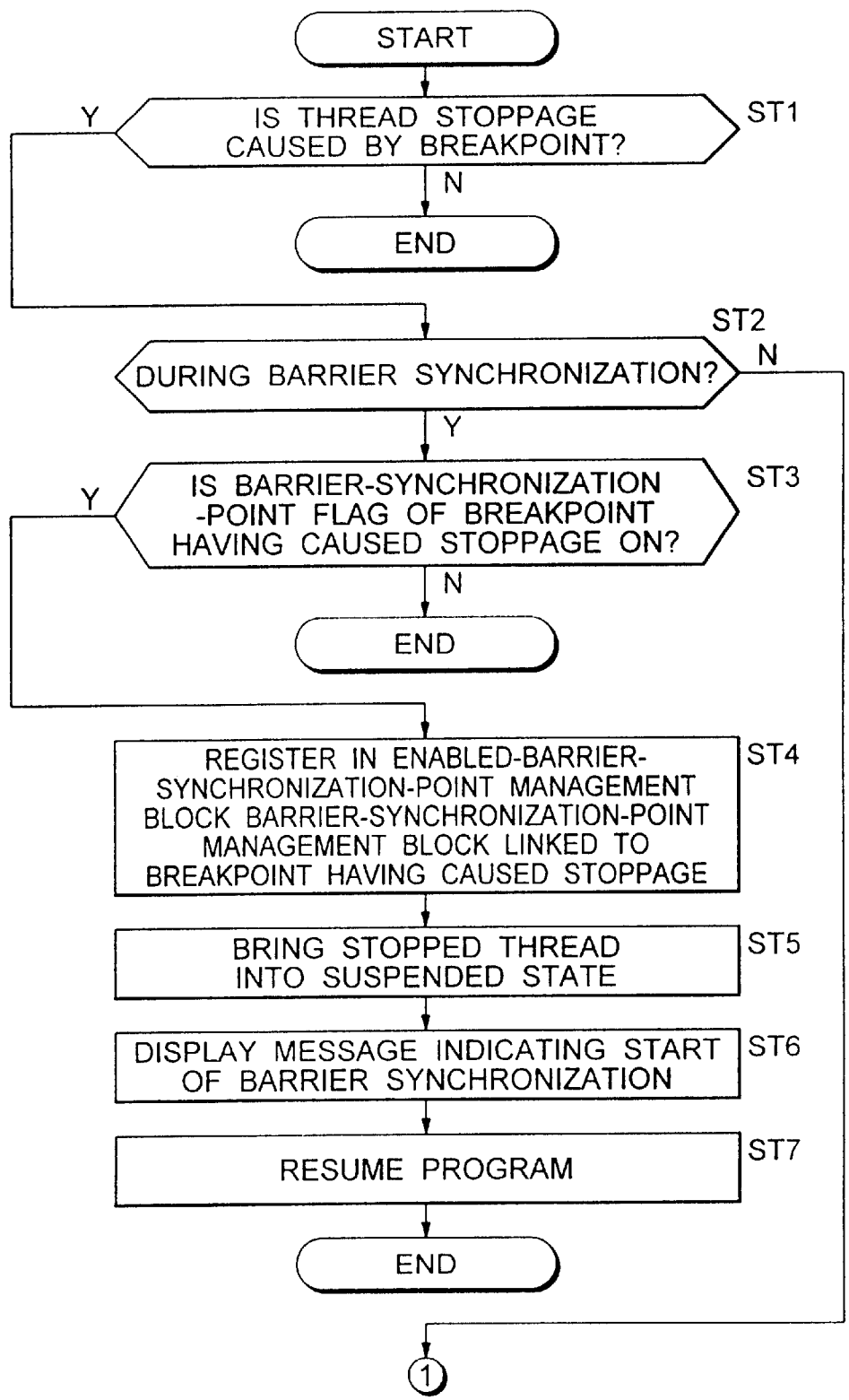
FIG. 8 is a flowchart showing the processing flow of a barrier synchronization-point execution control program.
Figure 9:
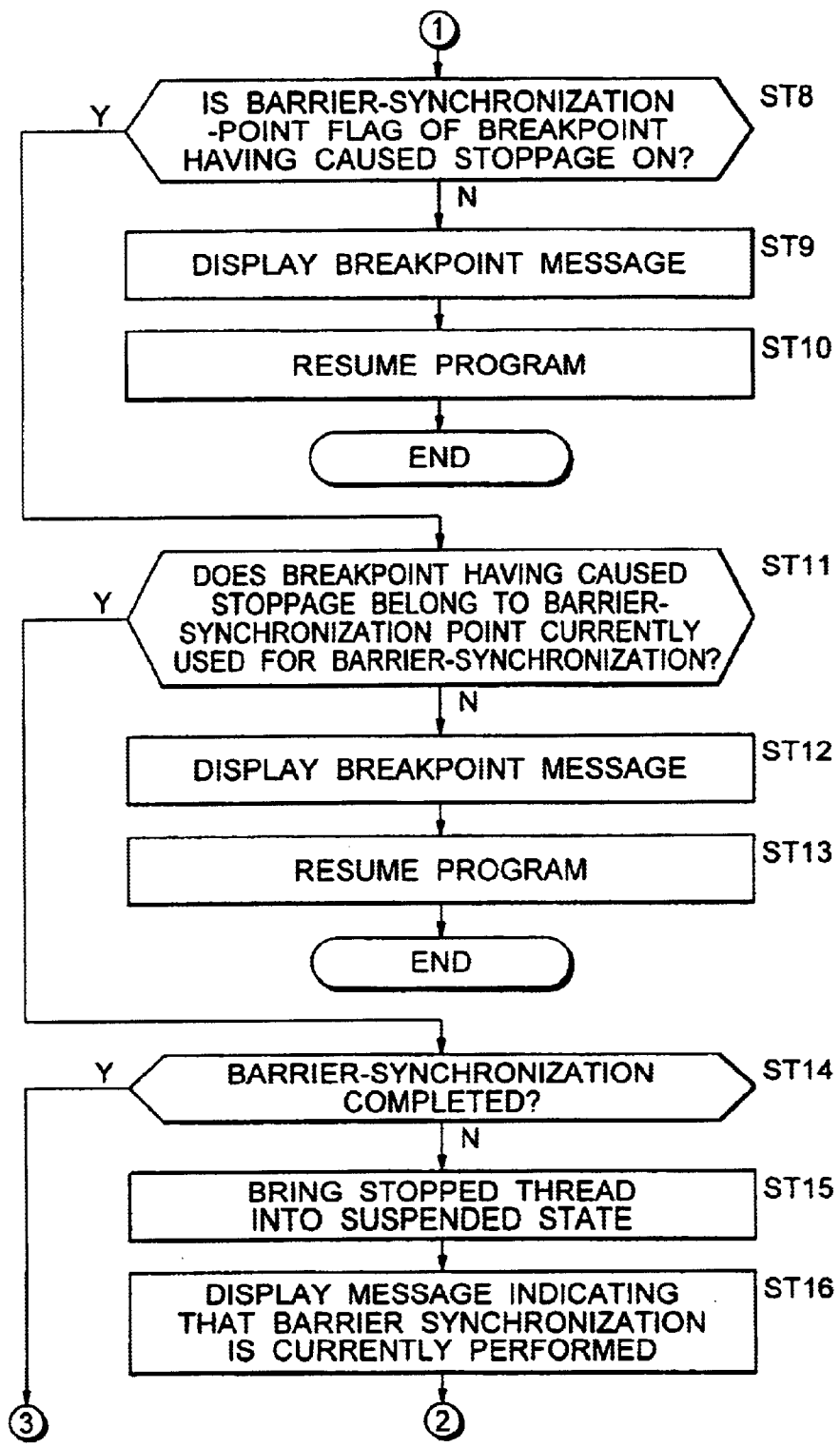
FIG. 9 is a flowchart showing the processing flow of a barrier synchronization-point execution control program.
Figure 10A:
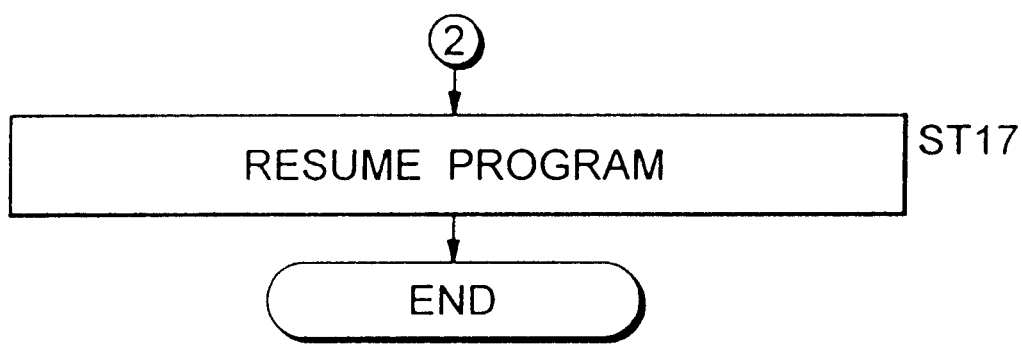
FIG. 10A is a flowchart showing the processing flow of a barrier synchronization-point execution control program.
Figure 10B:
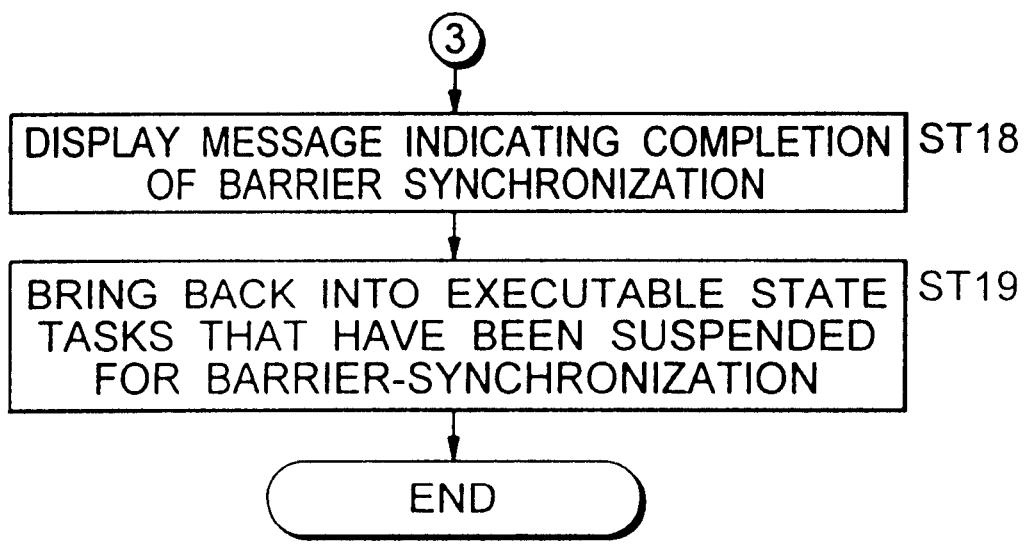
FIG. 10B is a flowchart showing the processing flow of a barrier synchronization-point execution control program.

FIG. 7 shows an exemplary flow of processing performed by the barrier synchronization-point information registration program 62; and FIGS. 8 to 10B show an exemplary flow of processing performed by the barrier synchronization-point execution control program 70. Next, the embodiment of the present invention will be described in detail with reference to these flowcharts.

The barrier synchronization-point information registration program 62 is started upon receipt, via the multithread debugger 30, of barrier synchronization points set by the barrier synchronization-point setting program 50. The barrier synchronization-point information registration program 62 sequentially selects the thus-set barrier synchronization points, performs the processing of FIG. 7 for the selected barrier synchronization points, and registers information of the set barrier synchronization points into the barrier synchronization-point information management region 61.

Specifically, as shown in FIG. 7, when the barrier synchronization-point information registration program 62 is started, a barrier synchronization-point management block 610-i corresponding to a selected barrier synchronization point is first created in step 1. Further, chaining is established between the barrier synchronization-point management block 610-i and an existing barrier synchronization-point management block 601-i.

In subsequent step 2, the selected barrier synchronization point is analyzed and is divided into breakpoints for respective threads. In subsequent step 3, judgment is made as to whether all divided breakpoints have been selected. When it is judged that all divided breakpoints have been selected, registration of information regarding the selected barrier synchronization point is judged to have been completed, and processing for the selected barrier synchronization point is ended.

When it is judged that not all divided breakpoints have been selected, the processing proceeds to step 4 in order to select an unselected breakpoint from the divided breakpoints. In subsequent step 5, judgment is made as to whether the selected breakpoint has already been put under management by the breakpoint management mechanism 40. When the selected breakpoint has not been put under management by the breakpoint management mechanism 40, the processing proceeds to step 6 in order to request the breakpoint management mechanism 40 to place the selected breakpoint under management by breakpoint management mechanism 40.

Since, for each breakpoint under management by breakpoint management mechanism 40, a breakpoint management block 611-i has been created for management thereof, in step 6, the request is issued to the breakpoint management mechanism 40 for each breakpoint which is not under the management by the breakpoint management mechanism 40. Thus, a breakpoint management block 611-i for managing such a breakpoint is created.

For the breakpoints managed by the thus-created breakpoint management block 611-i, the multithread debugger 30 inserts a program stop command at a designated program position of a designated thread, so that the program position serves as a breakpoint.

In subsequent step 7, a barrier synchronization-point flag of the breakpoint management block 611-i which manages the selected breakpoint is brought into an ON state in order to record that the breakpoint constitutes the barrier synchronization point.

In subsequent step 8, the breakpoint management block 611-i which manages the selected breakpoint is connected to the chain from the constituent breakpoint management chain of the created barrier synchronization-point management block 610-i. Subsequently, the processing returns to step 3.

In the above-described manner, upon receipt of a barrier synchronization point set by the barrier synchronization-point setting program 50, the barrier synchronization-point information registration program 62 registers information of the barrier synchronization point in the barrier synchronization-point information management area 61, in the form as shown in FIG. 3, by use of the barrier synchronization-point management block 610-i and the breakpoint management block 611-i.

Next, the processing of the barrier synchronization-point execution control program 70 will be described.

After completion of the barrier synchronization-point information registration program 62, the multithread debugger 30 starts the multithread program 20. When one of the threads stops due to some cause during execution of the multithread program 20, the multithread debugger 30 calls the barrier synchronization-point execution control program 70 and starts debugging of the multithread program 20.

When the barrier synchronization-point execution control program 70 is called in this manner, as shown in the flowcharts of FIGS. 8, 9, 10A, and 10B, in first step 1, judgment is made as to whether stoppage of the thread occurred due to presence of a breakpoint. When it is judged that the thread stoppage occurred due to a cause other than presence of a breakpoint, the barrier synchronization-point execution control program 70 judges that the thread stoppage is not an item to be processed, and returns control to the multithread debugger 30.

When it is judged in step 1 that the thread stoppage is caused by presence of a breakpoint, the processing proceeds to step 2 in order to judge whether a NULL pointer is registered in the enabled-barrier synchronization-point management block 612, to thereby judge whether barrier synchronization is being performed at present.

That is, when barrier synchronization is currently being performed (when the address of a barrier synchronization-point management block is set in the enabled-barrier synchronization-point management block 612), as described later, chaining to the barrier synchronization-point management block 610-i which manages a barrier synchronization-point currently being used for barrier synchronization is registered in the enabled-barrier synchronization-point management block 612. Through judgment as to whether a NULL pointer is registered in the enabled-barrier synchronization-point management block 612, judgment is performed as to whether barrier synchronization is currently being performed.

When the multithread program 20 is started, as a part of the initialization processing the multithread debugger 30 writes a NULL pointer into the enabled-barrier synchronization-point management block 612.

When it is judged that barrier synchronization is not currently being performed, on the basis of a state in which a NULL pointer is registered in the enabled-barrier synchronization-point management block 612, the processing proceeds to step 3 in order to judge whether the barrier synchronization-point flag of a breakpoint management block 611-i that manages a breakpoint having caused stoppage is in an ON state. When the barrier synchronization-point flag is judged to be in an OFF state, it is judged that stoppage has been caused by presence of a breakpoint which is not being used for barrier synchronization. In this case, control is returned to the multithread debugger 30 without performance of further processing. Thus, debugging for ordinary breakpoints is started.

By contrast, when it is judged in step 3 that the barrier synchronization-point flag of the breakpoint management block 611-i that manages a breakpoint having caused stoppage is in an ON state, barrier synchronization is judged to have started. Then, the processing proceeds to step 4 in order to register in the enabled-barrier synchronization-point management block 612 chaining to a barrier synchronization-point 610-i linked to the breakpoint management block 611-i.

In subsequent step 5, a stopped thread is brought into a suspended state (a state in which execution of the thread is not resumed upon resumption of the multithread program 20), and in subsequent step 6, a message indicating that barrier synchronization has been started is displayed for a programmer. In subsequent step 7, execution of the multithread program 20 is resumed. Further, control is returned to the multithread debugger 30.

When it is judged in step 2 that chaining to the barrier synchronization-point management block 610-i is registered in the enabled-barrier synchronization-point management block 612, the processing proceeds to step 8 (processing flow of FIG. 9) in order to judge whether the barrier synchronization-point flag of the breakpoint management block 611-i that manages the breakpoint having caused stoppage is in an ON state.

When the processing judges that the barrier synchronization-point flag of the breakpoint management block 611-i that manages the breakpoint having caused stoppage is in an OFF state, the processing proceeds to step 9 in order to display a message indicating that a breakpoint which does not constitute a barrier synchronization point has been reached. In subsequent step 10, execution of the multithread program 20 is resumed, and control is returned to the multithread debugger 30.

That is, since barrier synchronization has been started, execution of the multithread program 20 is resumed such that the program can reach a next breakpoint that constitutes a barrier synchronization point currently being used for barrier synchronization, while ignoring ordinary breakpoints.

When it is judged in step 8 that the barrier synchronization-point flag of the breakpoint management block 611-i that manages the breakpoint having caused stoppage is in an ON state, the processing proceeds to step 11 in order to judge whether the breakpoint management block 611-i is connected to the chain from the enabled-barrier synchronization-point management block 612.

When the judgment processing judges that the breakpoint management block 611-i that manages the breakpoint having caused stoppage is not connected to the chain from the enabled-barrier synchronization-point management block 612, the processing proceeds to step 12 in order to display a message indicating that the program has reached a breakpoint of a barrier synchronization point that is not currently being used for barrier synchronization. Further, in subsequent step 13, execution of the multithread program 20 is resumed, and control is returned to the multithread debugger 30.

That is, among a plurality of barrier synchronization points set in advance, barrier synchronization is performed by use of only a barrier synchronization point having a breakpoint management block for a breakpoint which is reached first. Therefore, execution of the multithread program 20 is resumed such that the program can reach a next breakpoint that constitutes a barrier synchronization point currently being used for barrier synchronization, while ignoring breakpoints of other barrier synchronization points.

When it is judged in step 11 that the breakpoint management block 611-i that manages the breakpoint having caused stoppage is connected to the chain from the enabled-barrier synchronization-point management block 612, the processing proceeds to step 14 and refers to the breakpoint management block 611-i connected to the chain. Subsequently, threads for which breakpoints belonging to the barrier synchronization point currently being used for barrier synchronization are set are specified, and barrier synchronization is judged to have been completed through judgment as to whether all the threads have stopped.

In some cases, the barrier synchronization point currently being used for barrier synchronization includes a breakpoint set for a thread that does not exist at the present time. In such cases, the above-described judgment processing is performed, while such a thread is regarded to have stopped.

That is, a thread that does not exist at the present time may be designated by the barrier synchronization point (e.g., when a programmer does not know whether such a thread is present or absent). Therefore, judgment as to whether all threads have been stopped at breakpoints belonging to the barrier synchronization point currently being used for barrier synchronization is performed while excluding breakpoints which are set for such a non-existing thread. In this way, judgment is performed as to whether barrier synchronization has been completed.

When the judging processing judges that barrier synchronization has not been completed, the processing proceeds to step 15 in order to bring a stopped thread into a suspended state (a state in which execution of the thread is not resumed upon resumption of the multithread program 20), and in subsequent step 16, a message indicating that barrier synchronization is being performed is displayed for a programmer. In subsequent step 17 (processing flow of FIG. 10A), execution of the multithread program 20 is resumed. Further, control is returned to the multithread debugger 30.

When it is judged in step 14 that barrier synchronization has been completed, the processing proceeds to step 18 (processing flow of FIG. 10B) in order to display a message indicating completion of the barrier synchronization. In subsequent step 19 (processing flow of FIG. 10B), the threads that have been brought into a suspended state for barrier synchronization are brought back to a state in which the threads can be executed, and control is returned to the multithread debugger 30.

When the barrier synchronization-point setting program 50 sets a plurality of barrier synchronization points as shown in FIG. 11, the barrier synchronization-point execution control program 70 selects a barrier synchronization point which has first stopped a thread, in order to use the selected barrier synchronization point for barrier synchronization.

Subsequently, threads which have reached breakpoints designated by the barrier synchronization point are sequentially brought into a suspended state. When stoppage of threads at the breakpoints belonging to the barrier synchronization point has been completed, the suspended threads are brought into an executable state. Further, control is returned to the multithread debugger 30.

In "target of barrier synchronization" in FIG. 11, (target) shows the thread is a target of barrier, and (no-target) shows the thread is not target of barrier synchronization.

As described above, the present invention can realize barrier synchronization which enables each of arbitrarily-selected threads to be stopped at an arbitrary target program position.

Next, barrier synchronization realized by the present invention will be described by use of an exemplary multithread program 20 shown in FIG. 12.

Figure 13:
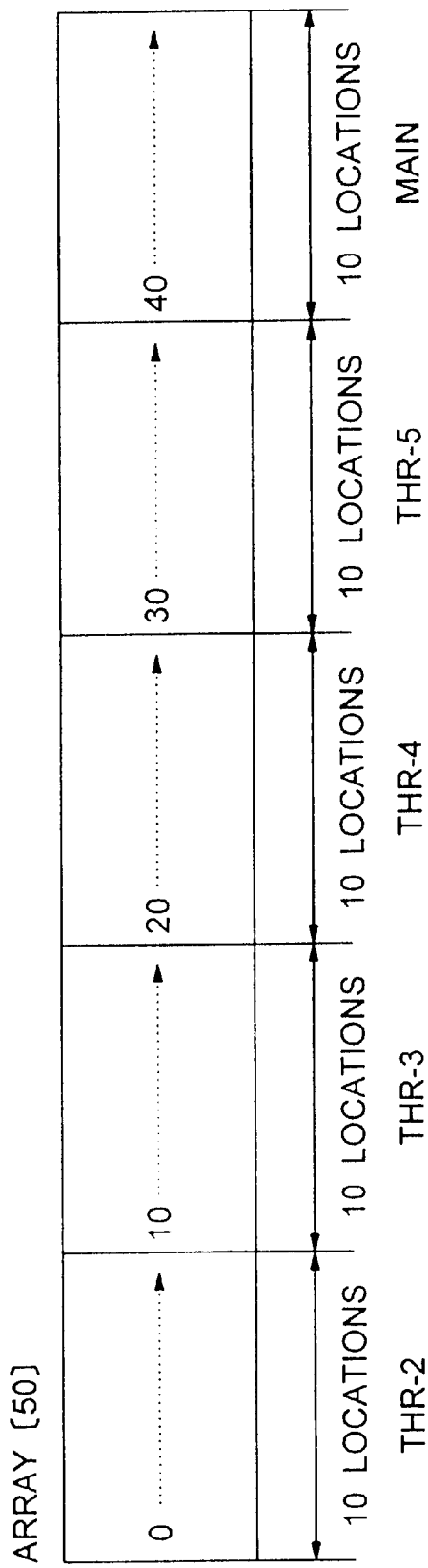
FIGS. 13 and 14 are diagrams used for description of a multithread program.
Figure 14:
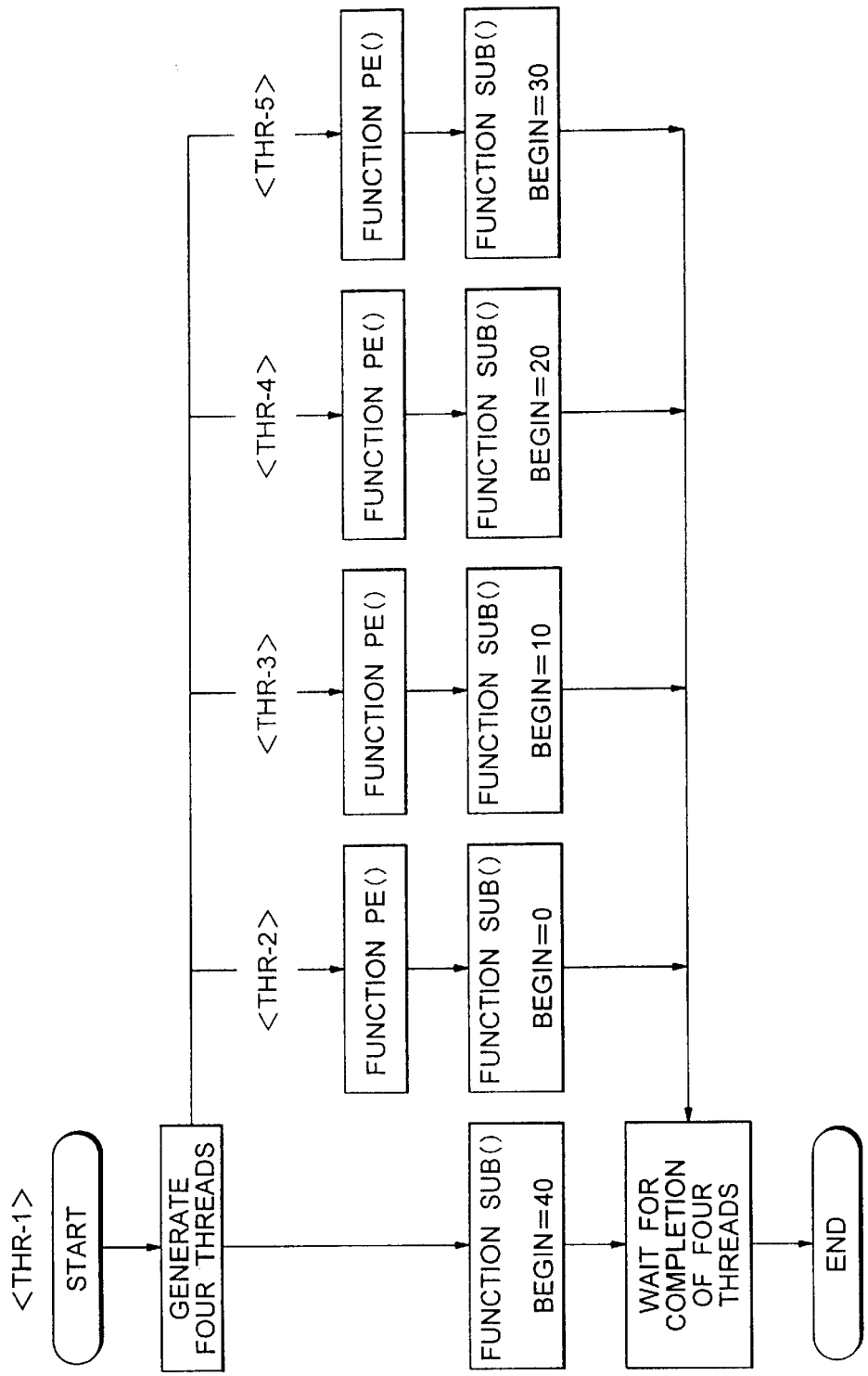

As shown in FIG. 13, the multithread program 20 shown in FIG. 12 performs processing for writing "0" into $0^{th}$ to $9^{th}$ positions, "10" into $10^{th}$ to $19^{th}$ positions, "20" into $20^{th}$ to $29^{th}$ positions, "30" into $30^{th}$ to $39^{th}$ positions, and "40" into $40^{th}$ to $49^{th}$ positions, respectively, of an array "array [50]," which is a global variable. As shown in FIG. 14, four threads (THR-2 to THR-5) are generated, and the above-described write processing is performed by use of the generated four threads and a function "main ( )" serving as an initial thread.

The operation of the multithread program 20 shown in FIG. 12 will be described. When the function main ( ) (line 20) is started, four threads are generated by a system function described on line 29 which is executed a plurality of times (four times) designated by a "for" sentence described on line 27.

In accordance with the description on line 29, each of the thus-generated threads calls a function "PE( )" (line 14), while passing an address "begin[i]" thereto. It is to be noted that, in accordance with the descriptions on lines 27 and 28, the following values are set into begin[i]:

begin[0]=0, begin[1]=10, begin[2]=20, begin[3]=30.

When the function PE( ) is called by a thread, the function PE( ) calls a function "sub" (line 6) while passing the entity (real value) of begin[i] thereto. Meanwhile, in accordance with the description on line 32, the function main ( ) calls the function sub( ) while passing "begin[4]=40" thereto.

When called in the above-described manner, according to the description on line 10, the function sub( ) writes "0" into $0^{th}$ to $9^{th}$ positions, "10" into $10^{th}$ to $19^{th}$ positions, "20" into $20^{th}$ to $29^{th}$ positions, "30" into $30^{th}$ to $39^{th}$ positions, and "40" into $40^{th}$ to $49^{th}$ positions, respectively, of the "array [50]."

The function main ( ) serving as the initial thread waits until all the threads—which the function main ( ) has generated—complete the processing performed in cooperation with the function sub ( ). When waiting is ended, the contents of the array "array [50]" set by the five threads are displayed, after which the processing ends.

As described above, four threads start their operations from the function PB ( ) simultaneously and independently and each executes the function sub ( ), which is a function for setting values into an array, while passing thereto the arguments which were passed at the time of generation of the threads. At this time, the function main ( ) serving as the initial thread executes the function sub ( ), as in the case of other threads, after generation of the threads.

At this point of time, the five threads simultaneously operate the function sub ( ), while changing the argument. In other words, the same command string (function sub ( )) on the same position is operated by the five threads.

When the multithread program 20 shown in FIG. 12 is debugged, it is necessary to confirm whether the writing processing shown in FIG. 13 has been performed properly.

For such a purpose, in the present invention, a barrier synchronization point is set for the five threads <THR-1> to <THR-5> such that line 11 of the multithread program 20 shown in FIG. 12 becomes a breakpoint. This enables debugging to be performed in such a way that five threads <THR-1> to <THR-5> are synchronized at line 11 by means of barrier synchronization, in order to confirm whether the writing processing shown in FIG. 13 has been performed properly.

A thread which first stops due to setting of the barrier synchronization point cannot be determined. Here, it is assumed that the thread <THR-2> first stops at a breakpoint that constitutes the barrier synchronization point; then the threads <THR-3>, <THR-4>, and <THR-5> stop, in this sequence; and the thread <THR-1> stops lastly.

In this case, in accordance with the above-described processing, barrier synchronization is started when the thread <THR-2> stops at line 11, so that the thread <THR-2> is brought into a suspended state, and then execution of the multithread program 20 is resumed.

Subsequently, the thread <THR-3> stops at line 11, so that the thread <THR-3> is brought into a suspended state. Further, the thread <THR-4> stops at line 11, so that the thread <THR-4> is brought into a suspended state, and the thread <THR-5> then stops at line 11, so that the thread <THR-5> is brought into a suspended state.

Lastly, the thread <THR-1> stops at line 11. At this time, completion of the barrier synchronization is confirmed on the basis of the state in which all the existing threads designated by a programmer have stopped at the barrier synchronization point, and the completion of the barrier synchronization is reported to the programmer. Further, the threads <THR-2>, <THR-3>, <THR-4>, and <THR-5> which have been brought into a suspended state for barrier synchronization are brought into a state in which their execution can be resumed, and control is then returned to the multithread debugger 30.

As described above, use of the present invention enables debugging of the multithread program 20 as shown in FIG. 12.

Although the above-described embodiment employs a structure which enables setting of a plurality of barrier synchronization points, a structure which enables setting of only a single barrier synchronization point may be employed. In such a modified embodiment, since a barrier synchronization point set in advance is used for barrier synchronization, provision of the enabled-barrier synchronization-point management 612 becomes unnecessary. Instead, a flag indicating whether barrier synchronization is performed is provided.

Figure 15:
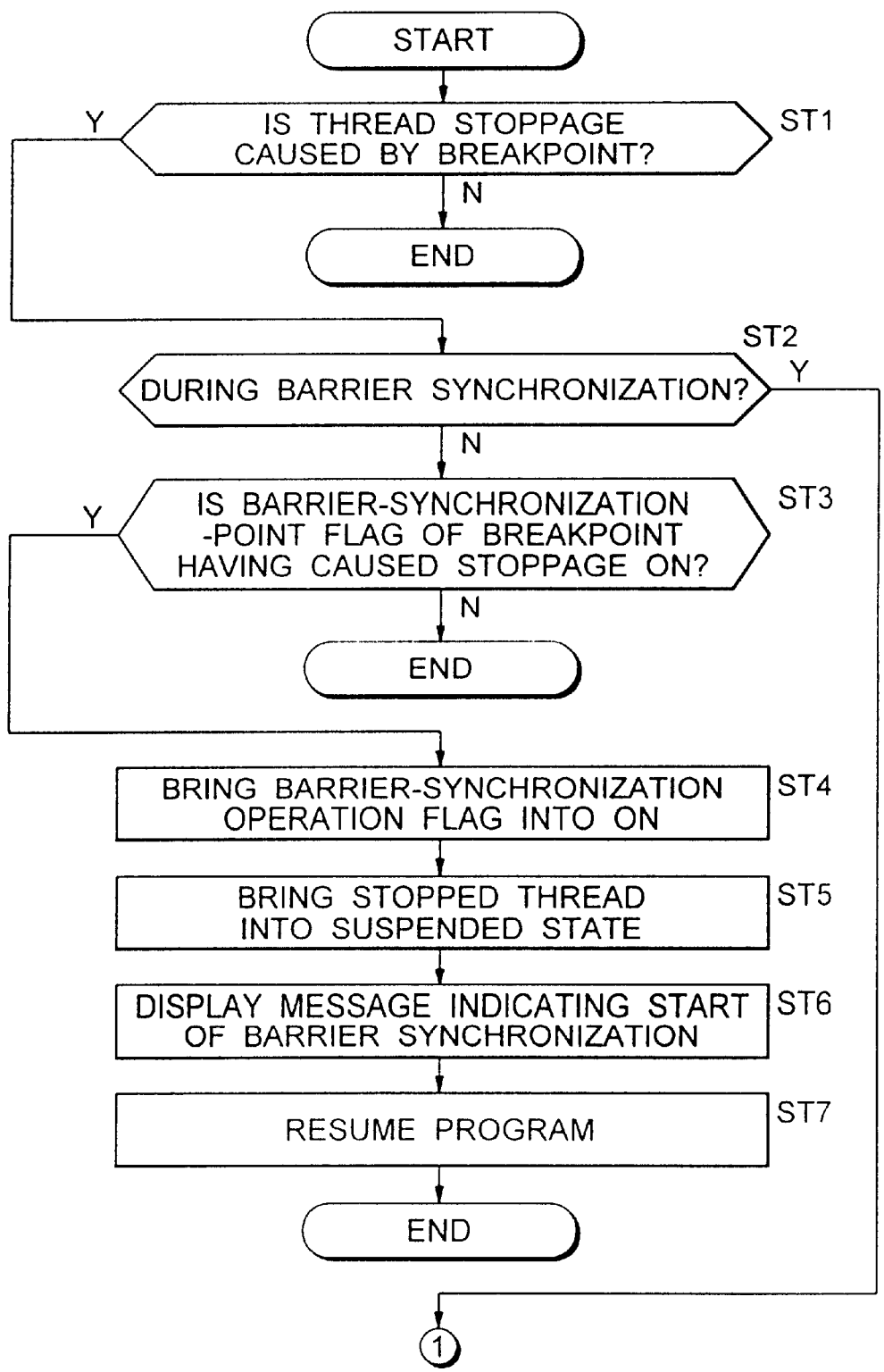
FIG. 15 is a flowchart showing the processing flow of a barrier synchronization-point execution control program.
Figure 16:
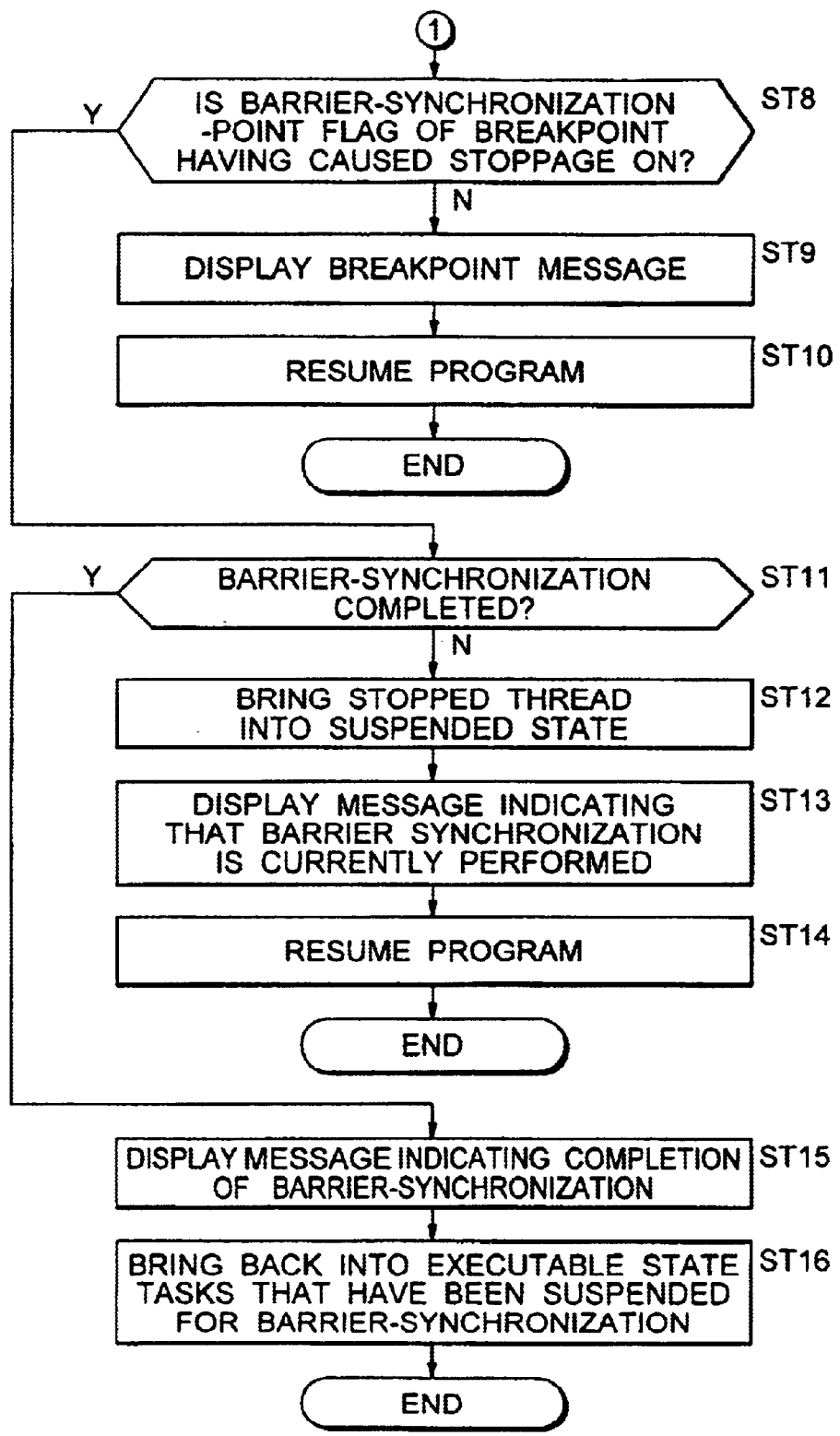
FIG. 16 is a flowchart showing the processing flow of a barrier synchronization-point execution control program.

In the modified embodiment, the barrier synchronization-point execution control program 70 executes processing shown in FIGS. 15 and 16 in place of the processing shown in FIGS. 8 to 10B.

When the multithread debugger 30 is called due to stoppage of any one of threads due to some cause, as shown by the flowchart of FIGS. 15 and 16, the barrier synchronization-point execution control program 70 first judges whether stoppage of the thread occurred due to presence of a breakpoint at step 1. When it is judged that the thread stoppage occurred due to a cause other than a breakpoint, the barrier synchronization-point execution control program 70 judges that the thread stoppage is not an item to be processed, and returns control to the multithread debugger 30.

When it is judged in step 1 that the thread stoppage is caused by a breakpoint, the processing proceeds to step 2 in order to judge whether the flag indicating whether barrier synchronization is being performed is in an ON state, to thereby judge whether barrier synchronization is being performed at present. It is to be noted that the flag is brought into an OFF state when execution of the multithread program 20 is started.

When the judgment processing judges that barrier synchronization is not currently being performed (flag is OFF), the processing proceeds to step 3 in order to judge whether the barrier synchronization-point flag of a breakpoint management block 611-i that manages a breakpoint having caused stoppage is in an ON state. When the barrier synchronization-point flag is judged to be in an OFF state, it is judged that stoppage has been caused by a breakpoint which is not used for barrier synchronization. In this case, control is returned to the multithread debugger 30 without performance of further processing. Thus, debugging for ordinary breakpoints is started.

By contrast, when it is judged in step 3 that the barrier synchronization-point flag of the breakpoint management block 611-i that manages a breakpoint having caused stoppage is in an ON state, barrier synchronization is judged to have started. Then, the processing proceeds to step 4 in order to bring into an ON state the flag (barrier synchronization operation flag) indicating whether barrier synchronization is being performed, to thereby record that barrier synchronization is currently being performed.

In subsequent step 5, a stopped thread is brought into a suspended state, and in subsequent step 6, a message indicating that barrier synchronization has been started is displayed for a programmer. In subsequent step 7, execution of the multithread program 20 is resumed. Further, control is returned to the multithread debugger 30.

When it is judged in step 2 that barrier synchronization is currently being performed, the processing proceeds to step 8 (processing flow of FIG. 16) in order to judge whether the barrier synchronization-point flag of the breakpoint management block 611-i that manages the breakpoint having caused stoppage is in an ON state.

When the processing judges that the barrier synchronization-point flag of the breakpoint management block 611-i that manages the breakpoint having caused stoppage is in an OFF state, the processing proceeds to step 9 in order to display a message indicating that a breakpoint which does not constitute a barrier synchronization point has been reached. In subsequent step 10, execution of the multithread program 20 is resumed, and control is returned to the multithread debugger 30.

That is, since barrier synchronization has been started, execution of the multithread program 20 is resumed such that the program can reach a next breakpoint that constitutes a barrier synchronization point currently being used for barrier synchronization, while ignoring ordinary breakpoints.

When it is judged in step 8 that the barrier synchronization-point flag of the breakpoint management block 611-i that manages the breakpoint having caused stoppage is in an ON state, the processing proceeds to step 11 in order to refer to another breakpoint management block 611-i which is connected to the above-described breakpoint management block 611-i via a barrier synchronization management chain (shown in FIG. 5). Thus, threads for which breakpoints belonging to the barrier synchronization point currently being used for barrier synchronization are set are specified, and barrier synchronization is judged to have been completed through judgment as to whether all the threads have stopped.

In some cases, the barrier synchronization point currently being used for barrier synchronization includes a breakpoint set for a thread that does not exist at the present time. In such cases, the above-described judgment processing is performed, while such a thread is regarded to have stopped.

That is, a thread that does not exist at the present time may be designated by the barrier synchronization point. Therefore, the judgment as to whether all threads have been stopped at breakpoints belonging to the barrier synchronization point currently being used for barrier synchronization is performed, while excluding breakpoints which are set for such non-existing threads. In this way, judgment is performed as to whether barrier synchronization has been completed.

When the above-described judging processing judges that barrier synchronization has not been completed, the processing proceeds to step 12 in order to bring a stopped thread into a suspended state. In subsequent step 13, a message indicating that barrier synchronization is being performed is displayed for a programmer. In subsequent step 14, execution of the multithread program 20 is resumed, and control is returned to the multithread debugger 30.

When it is judged in step 11 that barrier synchronization has been completed, the processing proceeds to step 15 in order to display a message indicating completion of the barrier synchronization. In subsequent step 16, the threads that have been brought into a suspended state for barrier synchronization are brought back to a state in which the threads can be executed, and control is returned to the multithread debugger 30.

As described above, when the structure which permits setting of a single barrier synchronization point is employed, the barrier synchronization-point execution control program 70 performs barrier synchronization for the multithread program 20 through execution of the processing shown in FIGS. 15 and 16.

As described above, the present invention can realize barrier synchronization which enables each of arbitrarily-selected threads to be stopped at an arbitrary target program position during debugging of a multitask program.

Accordingly, debugging of a multitask program in which a plurality of tasks perform initialization processing or calculation processing, each task taking partial charges of the processing, can be performed efficiently.

In the present invention, in the case where the apparatus is configured to enable input of a plurality of barrier synchronization points, the apparatus is configured such that barrier synchronization is achieved by a barrier synchronization point to which a breakpoint first reached by a task belongs. Therefore, the apparatus can perform debugging on the basis of barrier synchronization while matching the execution sequence of a program.

Although the present invention have been described with reference to the embodiment, the present invention is not limited thereto. For example, in the embodiment, the present invention is described with reference to an exemplary case in which barrier synchronization is performed for a multithread program 20, the present invention can be applied, as is, to other types of multitask programs, such as a multiprocess program which executes a plurality of interdependent processes. Further, the present invention can generally be applied to parallel processing programs. Although in the embodiment barrier synchronization is effected by use of breakpoints, barrier synchronization may be effected while a specific event or processing is used as an operation point for debugging.

The many features and advantages of the invention are apparent from the detailed specification and, thus, the appended claims are intended to cover all such features and advantages of the invention which fall within the true spirit and scope of the invention. Further, since numerous modifications and changes will readily occur to those skilled in the art, it is not intended that the invention is limited to the exact construction and operation illustrated and described, and accordingly all suitable modifications and equivalents may be resorted to, so long as they fall within the scope of the invention.

What is claimed is:

1. A debugging apparatus for debugging a multitask program, comprising:

a setting unit for setting a barrier synchronization point which groups a breakpoint set for each of a plurality of tasks;

a judgment unit operating each time a different one of the tasks stops at a corresponding breakpoint, in order to judge whether all tasks having breakpoints belonging to the barrier synchronization point have stopped at the respective breakpoints;

a resumption unit bringing a newly stopped task into a suspended state and then resuming execution of a multithread program, upon judgment by the judgment unit that not all of the plurality of tasks have stopped;

a control unit for bringing the suspended tasks back to an executable state when the judgment means judges that all the tasks have stopped; and an execution unit, wherein when after barrier synchronization operation is started in response to stoppage of a task at a breakpoint belonging to a certain barrier synchronization point the task is stopped at a certain breakpoint belonging to the certain barrier synchronization point and set so as to be out of constitution of the barrier synchronization point, the execution unit resumes the multitask program while ignoring the certain breakpoint.

2. A debugging apparatus according to claim 1, wherein a breakpoint belonging to the barrier synchronization point which does not exist or work in the task is accounted to have stopped.

3. A debugging apparatus for debugging a multitask program, comprising:

a setting unit for setting a plurality of barrier synchronization points, each of which groups a breakpoint set for each of a plurality of tasks;

a specifying unit for specifying a barrier synchronization point which includes a breakpoint that has first stopped a corresponding task;

a judgment unit operating each time a different one of the plurality of tasks stops at a corresponding breakpoint, in order to judge whether all tasks having breakpoints belonging to the specified barrier synchronization point as specified by the specifying unit have stopped at the respective breakpoints;

a resumption unit bringing a newly stopped task into a suspended state and then resuming execution of a multithread program, upon judgment by the judgment unit that not all of the plurality of tasks have stopped; and a control unit for bringing the suspended tasks back to an executable state when the judgment means judges that all the tasks have stopped.

4. A debugging apparatus according to claim 3, further comprising an execution unit which operates, upon stoppage of a task at a certain breakpoint belonging to a barrier synchronization point other than the barrier synchronization point specified by the specifying unit, in order to resume the multitask program while ignoring the certain breakpoint.

5. A debugging apparatus according to claim 4, wherein, in the execution unit, after barrier synchronization operation is started in response to stoppage of a task at a breakpoint belonging to a certain barrier synchronization point, the task is stopped at a certain breakpoint belonging to the certain barrier synchronization point and set so as to be out of constitution of the barrier synchronization point, the execution unit resuming the multitask program while ignoring the certain breakpoint.

6. A debugging apparatus according to claim 3, further comprising an execution unit, wherein after barrier synchronization operation is started in response to stoppage of a task at a breakpoint belonging to a certain barrier synchronization point, the task is stopped at a certain breakpoint belonging to the certain barrier synchronization point and set so as to be out of constitution of the barrier synchronization point, the execution unit resuming the multitask program while ignoring the certain breakpoint.

7. A debugging apparatus according to claim 3, wherein a breakpoint belonging to the barrier synchronization point which does not exist or work in the task is accounted to have stopped.

8. A debugging method for debugging a multitask program, comprising:
   setting a plurality of barrier synchronization points each of which groups a breakpoint set for each of a plurality of tasks;
   specifying a barrier synchronization point which includes a breakpoint that has first stopped a corresponding task;
   each time a different one of the tasks stops at a corresponding breakpoint, judging whether all tasks having breakpoints belonging to the specified barrier synchronization point have stopped at the respective breakpoints;
   when it is judged that not all the tasks have stopped, bringing a newly stopped task into a suspended state and then resuming execution of a multithread program; and
   bringing the suspended tasks back to an executable state when it is judged that all the tasks have stopped.

9. A debugging method for debugging a multitask program according to claim 8, further comprising executing operation, upon stoppage of a task at a certain breakpoint belonging to a barrier synchronization point other than the barrier synchronization point specified by the specifying unit, in order to resume the multitask program while ignoring the certain breakpoint.

10. A debugging method for debugging a multitask program according to claim 8, further comprising an execution unit, wherein after barrier synchronization operation is started in response to stoppage of a task at a breakpoint belonging to a certain barrier synchronization point, the task is stopped at a certain breakpoint belonging to the certain barrier synchronization point and set so as to be out of constitution of the barrier synchronization point, the execution unit resuming the multitask program while ignoring the certain breakpoint.

11. A debugging method for debugging a multitask program according to claim 8, wherein a breakpoint belonging to the barrier synchronization point which does not exist or work in the task is accounted to have stopped.

12. A program recording medium storing a program for realizing a debugging apparatus for multitask programs, the program causing a computer to perform:

a setting process for setting a plurality of barrier synchronization points each of which groups a breakpoint set for each of a plurality of tasks;
   a specifying process for specifying a barrier synchronization point which includes a breakpoint that has first stopped a corresponding task;
   a judging process, each time a different one of the tasks stops at a corresponding breakpoint, in order to judge whether all tasks having breakpoints belonging to the barrier synchronization point specified by the specifying process have stopped at the respective breakpoints;
   a resumption process for bringing a newly stopped task into a suspended state and then resuming execution of a multithread program, upon judgment by the judgment process that not all the tasks have stopped; and
   a control process for bringing the suspended tasks back to an executable state when the judgment process judges that all the tasks have stopped.

13. A program recording medium storing a program for realizing a debugging apparatus for multitask programs according to claim 12, further comprising executing operation, upon stoppage of a task at a certain breakpoint belonging to a barrier synchronization point other than the barrier synchronization point specified by the specifying process, in order to resume the multitask program while ignoring the certain breakpoint.

14. A program recording medium storing a program for realizing a debugging apparatus for multitask programs according to claim 12, further comprising an execution unit, wherein after barrier synchronization operation is started in response to stoppage of a task at a breakpoint belonging to a certain barrier synchronization point, the task is stopped at a certain breakpoint belonging to the certain barrier synchronization point and set so as to be out of constitution of the barrier synchronization point, the execution unit resuming the multitask program while ignoring the certain breakpoint.

15. A program recording medium storing a program for realizing a debugging apparatus for multitask programs according to claim 12, wherein a breakpoint belonging to the barrier synchronization point which does not exist or work in the task is accounted to have stopped.

16. A debugging apparatus for debugging a parallel processing program, comprising:
   a setting unit for setting barrier synchronization points;
   an operation point managing unit for managing operation points;
   a barrier synchronization-point management unit for creating a barrier synchronization-point management block to correspond to a selected barrier synchronization point, establishing connection with another existing barrier synchronization-point management block, creating an operation point management block for each of the operation points under management by the operation point managing unit, establishing connection with an operation point management block that manages the operation point, and registering the barrier synchronization-point management block, the operation point management block, and the connections; and
   a barrier synchronization-point execution control unit for effecting barrier synchronization on the basis of the registered information regarding the barrier synchronization point.

17. A debugging apparatus according to claim 16, wherein the barrier synchronization-point execution control unit:

analyzes a selected barrier synchronization point;

detects stoppage of a certain parallel processing element due to processing of an operation point set thereto, and when the certain parallel processing element is to undergo barrier synchronization, brings the certain parallel processing element in a suspended state; and resumes the program, repeats the above processing, and when the processing has been performed for all the parallel processing elements, brings the parallel processing units back to an executable state.

18. A debugging apparatus according to claim 17, wherein the barrier synchronization-point management unit comprises an enabled-barrier synchronization-point management block used for judging whether the program is in a barrier synchronization operation, and when the program is not in the barrier synchronization operation, null data are set in the enabled-barrier synchronization-point management block in order to indicate that the program is not in the barrier synchronization operation.

19. A debugging apparatus according to claim 18, wherein when it is judged that the program is in a barrier synchronization operation, an address of a relevant barrier synchronization-point management block is set in the enabled-barrier synchronization-point management block.

20. A debugging apparatus according to claim 16, wherein each operation point is a breakpoint.

* * * * *